(12) United States Patent
Malat et al.

(10) Patent No.: US 7,415,267 B2
(45) Date of Patent: Aug. 19, 2008

(54) METHODS AND SYSTEMS FOR MANAGING CALL REPORTS FOR THE FINANCIAL SERVICES INDUSTRY

(75) Inventors: Scott Malat, New York, NY (US); David Dussel, East Meadow, NY (US); Cheryl Black, Tenafly, NJ (US); James Priolo, New York, NY (US); Sharon Murphy, North Plainfield, NJ (US); Jackie Marfleet, Ealing (GB); Douglas W. Ross, New York, NY (US); Susan Herzog, Salem, NY (US)

(73) Assignee: JP Morgan Chase Bank, New York, NY (US)

( * ) Notice: Subject to any disclaimer, the term of this patent is extended or adjusted under 35 U.S.C. 154(b) by 624 days.

(21) Appl. No.: 10/766,790

(22) Filed: Jan. 27, 2004

(65) Prior Publication Data

US 2005/0132187 A1    Jun. 16, 2005

Related U.S. Application Data

(60) Provisional application No. 60/529,514, filed on Dec. 15, 2003.

(51) Int. Cl.
*H04M 11/00* (2006.01)
*H04M 3/42* (2006.01)
(52) U.S. Cl. ............... 455/406; 455/405; 455/414.1
(58) Field of Classification Search ........... 455/405, 455/406, 414.1; 379/111, 114.01
See application file for complete search history.

(56) References Cited

U.S. PATENT DOCUMENTS

| 4,649,563 A | 3/1987 | Riskin |
| 4,694,483 A | 9/1987 | Cheung |
| 4,792,968 A | 12/1988 | Katz |
| 4,797,913 A | 1/1989 | Kaplan |
| 4,845,739 A | 7/1989 | Katz |
| 4,930,150 A | 5/1990 | Katz |
| 4,939,773 A | 7/1990 | Katz |
| 4,964,043 A | 10/1990 | Galvin |
| 4,975,945 A | 12/1990 | Carbullido |
| 4,977,455 A | 12/1990 | Young |
| 4,987,590 A | 1/1991 | Katz |
| 5,014,298 A | 5/1991 | Katz |
| 5,023,904 A | 6/1991 | Kaplan |
| 5,025,373 A | 6/1991 | Keyser, Jr. |
| 5,073,929 A | 12/1991 | Katz |

(Continued)

OTHER PUBLICATIONS

Telephony, CTI (Computer-Telephony Integration), Internet, May 25, 1999, 1 page.

(Continued)

*Primary Examiner*—Barry W Taylor
(74) *Attorney, Agent, or Firm*—Lowenstein Sandler PC

(57) ABSTRACT

The present invention provides methods and systems for managing call reports. A call report message and information identifying a client matter are received via a wireless network, a distribution list is determined by applying a set of visibility rules, and the call report is created. Access to the call report is based on the distribution list. The visibility rules are rules that encapsulate the various legal and ethical requirements for allowing access to a client matter. The visibility rules may be created using a suitable script language, and be adjusted from time to time.

23 Claims, 4 Drawing Sheets

Wireless Device 100

101  Select Call Report
103  Choose Contacts
105  Choose Sensitivity Level
107  Write Message
109  Submit Call Report Server 150

110  Receive Call Report
112  Apply Visibility Rules to determine Distribution List
114  Make Call Report Available to Persons on Distribution list

U.S. PATENT DOCUMENTS

| | | |
|---|---|---|
| 5,091,933 A | 2/1992 | Katz |
| 5,128,984 A | 7/1992 | Katz |
| 5,164,981 A | 11/1992 | Mitchell et al. |
| 5,181,238 A | 1/1993 | Medamana |
| 5,185,787 A | 2/1993 | Katz |
| 5,206,903 A | 4/1993 | Kohler |
| 5,212,789 A | 5/1993 | Rago |
| 5,224,153 A | 6/1993 | Katz |
| 5,231,571 A | 7/1993 | D'Agostino |
| 5,251,252 A | 10/1993 | Katz |
| 5,255,309 A | 10/1993 | Katz |
| 5,262,860 A | 11/1993 | Fitzpatrick |
| 5,278,898 A | 1/1994 | Cambray |
| 5,297,197 A | 3/1994 | Katz |
| 5,309,505 A | 5/1994 | Szlam |
| 5,309,513 A | 5/1994 | Rose |
| 5,351,285 A | 9/1994 | Katz |
| 5,359,645 A | 10/1994 | Katz |
| 5,396,542 A | 3/1995 | Alger |
| 5,436,965 A | 7/1995 | Grossman |
| 5,442,688 A | 8/1995 | Katz |
| 5,444,774 A | 8/1995 | Friedes |
| 5,450,479 A | 9/1995 | Alesio |
| 5,465,290 A | 11/1995 | Hampton |
| 5,467,391 A | 11/1995 | Donaghue, Jr. |
| 5,495,284 A | 2/1996 | Katz |
| 5,511,112 A | 4/1996 | Szlam |
| 5,511,117 A | 4/1996 | Zazzera |
| 5,513,250 A | 4/1996 | McAllister |
| 5,515,428 A | 5/1996 | Sestak et al. |
| 5,517,566 A | 5/1996 | Smith |
| 5,519,772 A | 5/1996 | Akman |
| 5,553,120 A | 9/1996 | Katz |
| 5,555,299 A | 9/1996 | Maloney et al. |
| 5,559,855 A | 9/1996 | Dowens et al. |
| 5,561,707 A | 10/1996 | Katz |
| 5,561,711 A | 10/1996 | Muller |
| 5,563,933 A | 10/1996 | August |
| 5,570,295 A | 10/1996 | Isenberg |
| 5,570,465 A | 10/1996 | Tsakanikas |
| 5,592,378 A | 1/1997 | Cameron |
| 5,608,785 A | 3/1997 | Kasday |
| 5,608,789 A | 3/1997 | Fisher |
| 5,621,789 A | 4/1997 | McCalmont |
| 5,657,383 A | 8/1997 | Gerber |
| 5,675,607 A | 10/1997 | Alesio et al. |
| 5,684,863 A | 11/1997 | Katz |
| 5,684,870 A | 11/1997 | Maloney |
| 5,740,231 A | 4/1998 | Cohn et al. |
| 5,742,675 A | 4/1998 | Kilander |
| 5,757,904 A | 5/1998 | Anderson |
| 5,761,288 A | 6/1998 | Pinard et al. |
| 5,761,624 A | 6/1998 | Mooney |
| 5,784,452 A | 7/1998 | Carney |
| 5,787,154 A | 7/1998 | Hazra |
| 5,787,156 A | 7/1998 | Katz |
| 5,790,650 A | 8/1998 | Dunn |
| 5,793,846 A | 8/1998 | Katz |
| 5,793,861 A | 8/1998 | Haigh |
| 5,802,502 A | 9/1998 | Gell |
| 5,815,551 A | 9/1998 | Katz |
| 5,825,856 A | 10/1998 | Porter et al. |
| 5,825,870 A | 10/1998 | Miloslavsky |
| 5,828,734 A | 10/1998 | Katz |
| 5,835,576 A | 11/1998 | Katz |
| 5,835,580 A | 11/1998 | Fraser |
| 5,835,603 A | 11/1998 | Coutts |
| 5,845,259 A | 12/1998 | West et al. |
| 5,864,830 A | 1/1999 | Armetta et al. |
| 5,884,032 A | 3/1999 | Bateman |
| 5,898,762 A | 4/1999 | Katz |
| 5,917,893 A | 6/1999 | Katz |
| 5,923,745 A | 7/1999 | Hurd |
| 5,933,816 A | 8/1999 | Zeanah et al. |
| 5,974,120 A | 10/1999 | Katz |
| 6,016,344 A | 1/2000 | Katz |
| 6,134,315 A | 10/2000 | Galvin |
| 6,134,530 A | 10/2000 | Bunting et al. |
| 6,170,011 B1 | 1/2001 | Beck et al. |
| 6,175,563 B1 | 1/2001 | Miloslavsky |
| 6,208,638 B1 | 3/2001 | Rieley et al. |
| 6,212,178 B1 | 4/2001 | Beck et al. |
| 6,230,287 B1 | 5/2001 | Pinard et al. |
| 6,233,332 B1 | 5/2001 | Anderson et al. |
| 6,256,515 B1 | 7/2001 | Cox et al. |
| 6,301,351 B1 | 10/2001 | King |
| 6,304,653 B1 | 10/2001 | O'Neil et al. |
| 6,311,231 B1 | 10/2001 | Bateman et al. |
| 6,327,359 B1 | 12/2001 | Kang et al. |
| 6,330,327 B1 | 12/2001 | Lee et al. |
| 6,529,187 B1 | 3/2003 | Dickelman |
| 6,597,688 B2 | 7/2003 | Narasimhan et al. |
| 6,625,642 B1 | 9/2003 | Naylor et al. |
| 6,631,402 B1 | 10/2003 | Devine et al. |
| 6,640,304 B2 | 10/2003 | Ginter et al. |
| 6,714,642 B2 | 3/2004 | Dhir et al. |
| 6,832,366 B2 * | 12/2004 | Kouznetsov et al. ......... 717/106 |
| 2001/0044325 A1 | 11/2001 | Cox et al. |
| 2002/0002520 A1 | 1/2002 | Gatto |
| 2002/0021791 A1 | 2/2002 | Heilmann et al. |
| 2002/0052820 A1 | 5/2002 | Gatto |
| 2002/0064149 A1 | 5/2002 | Elliott et al. |
| 2002/0095454 A1 | 7/2002 | Reed et al. |
| 2002/0107889 A1 * | 8/2002 | Stone et al. .................. 707/513 |
| 2002/0119786 A1 | 8/2002 | Boehmke |
| 2002/0128036 A1 * | 9/2002 | Yach et al. ................... 455/552 |
| 2002/0184527 A1 * | 12/2002 | Chun et al. .................. 713/201 |
| 2003/0086554 A1 | 5/2003 | Krimstock et al. |
| 2003/0158960 A1 | 8/2003 | Engberg |
| 2003/0163431 A1 | 8/2003 | Ginter et al. |
| 2003/0191719 A1 | 10/2003 | Ginter et al. |
| 2004/0176973 A1 * | 9/2004 | Lapeze et al. ................... 705/1 |
| 2005/0182767 A1 * | 8/2005 | Shoemaker et al. ........... 707/10 |
| 2007/0053367 A1 * | 3/2007 | Tyebji ....................... 370/401 |

OTHER PUBLICATIONS

VOCLTEC Ltd.; VOCALTEC Telephony Gateway, Product Brochure, Jan. 1, 1996.
Internet Telephony, Computer Telephony Solutions, Internet, May 25, 1999, 1 page.
Computer Telephony Systems, Computer Telephony Solutions, Internet, May 29, 1999, 3 pages.
Call and Web Centres, Computer Technology Solutions, Internet, May 25, 1999, 5 pages.
VOCALTEC Ltd.; Telephony Gateway, Jan. 1, 1996, pp. 1-9.
Mahoney; Customer Base Management: Leverage Telemarketing and Call Center Environment, Direct Marketing, vol. 59, No. 6, Oct. 1, 1996, p. 20.
U.S. Court of Appeals for the Federal Circuit; IEX Corporation vs. Blue Pumpkin Software, Inc., Feb. 2, 2005.

* cited by examiner

METHODS AND SYSTEMS FOR MANAGING CALL REPORTS FOR THE FINANCIAL SERVICES INDUSTRY

CROSS REFERENCE TO RELATED APPLICATIONS

This application claims the benefit of U.S. Provisional Application Ser. No. 60/529,514, filed by Malat et al. on Dec. 15, 2003 and entitled "Methods and Systems For Managing Call Reports For The Financial Services Industry", which is incorporated herein by reference.

FIELD OF THE INVENTION

The present invention relates generally to customer relationship management (CRM) systems, and, more particularly, to providing a CRM application for managing call reports for the financial services industry.

BACKGROUND OF THE INVENTION

Currently, many investment bankers communicate by using a wireless device to send electronic mail (e-mail). Although e-mail is useful, it can be difficult to identify and send messages to all of the right people. One major problem is that sensitive financial information must only be provided to those allowed to view it. For example, a stock analyst must rely solely on publicly-available information. Inside information should not be communicated to the analyst.

To deal with this situation, firms typically erect "walls" to separate employees working on conflicting matters. Although it is possible to obtain a list of persons who are allowed to view the information, it usually is a time-consuming process. What is needed are new methods to allow financial information to be transmitted in a timely manner which guarantee that only those entitled to receive the information will have access. Preferably a wireless device should be used to enable this information to be sent regardless of location.

SUMMARY OF THE INVENTION

The present invention provides methods and systems for managing call reports for the financial services industry. In general, a call report is a document, usually created in the field, which contains a message that summarizes (or otherwise comments upon) an event. For example, in the financial services industry, an investment banker may create a call report to summarize a meeting with a CEO regarding possible buy-out scenarios. The call report might then be transmitted back to the home office, where a team of employees quickly begin to assemble pertinent information.

According to the methods and systems of the present invention, a call report message and information identifying a client matter are received via a wireless network, a distribution list is determined by applying a set of visibility rules, and the call report is created. Access to the call report is based on the distribution list. The visibility rules are rules that encapsulate the various legal and ethical requirements for allowing access to a client matter. The visibility rules may be created using a suitable script language, and be adjusted from time to time.

Once the call report is created, it can be made available to users via access to a server. Alternatively, the call report may be distributed via e-mail, such as, for example, as an e-mail attachment. In general, the call report can be accessed in any suitable manner.

In various embodiments, a wireless device useable to create a call report has both an on-line operating mode and an off-line operating mode. The device will be in the on-line operating mode when a network connection is available. Otherwise, the device will be in the off-line operating mode. In an embodiment, information can be entered using the wireless device in the off-line mode, and automatically transmitted when the device assumes the on-line mode.

These and other aspects, features and advantages of the present invention will become apparent from the following detailed description of preferred embodiments, which is to be read in connection with the accompanying drawings.

DESCRIPTION OF PREFERRED EMBODIMENTS

Customer Relationship Management (CRM) is a methodology for using information technology to help an enterprise manage customer relationships in an organized manner. While many software vendors offer CRM packages, no vendor has provided a solution to the particular problems faced by the financial services industry in managing call reports.

The present invention makes up for this deficiency by providing a CRM application for managing call reports for the financial services industry. In general, a call report is a document, usually created by a mobile user, which contains a message regarding an event. For example, in the financial services industry, an investment banker might create a call report to summarize an important client meeting. The call report could then be transmitted back to the home office.

Figure 1:
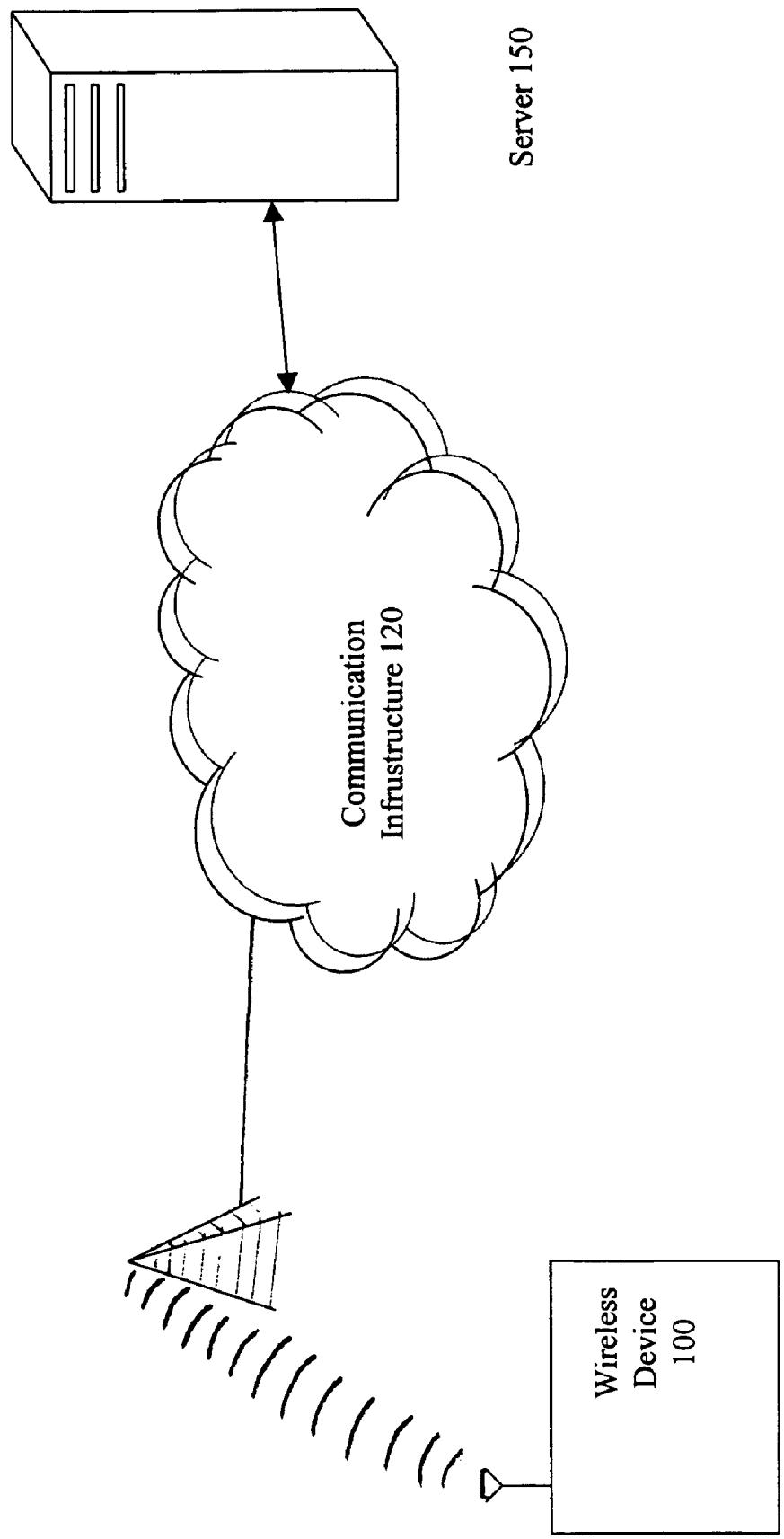
FIG. 1 is a high-level diagram of an exemplary communication system to which the present invention may be applied.

First, an exemplary system architecture for managing call reports in accordance with the invention is described in the context of FIG. 1. As depicted in FIG. 1, a Wireless Device 100 is connected to a Server 150 via a Communication Infrastructure 120.

The Wireless Device 100 will preferably include a browser-based, wireless communication device, such as a wireless personal digital assistant (PDA). The wireless communication device will preferably feature a display screen, and be configured (programmed) to include a selection mechanism for selecting a list of contacts, displaying a message being written, and performing various functions to create and submit a call report, as described herein. Representative wireless handheld products include the BLACKBERRY™ device made by Research In Motion Ltd., the TREO™ device made by Handspring, Inc., and the TUNGSTEN™ device made by Palm, Inc.

Preferably, the Server 150 will run one or more Customer Relationship Management (CRM) system. Representative CRM systems useable for this purpose include those made by Siebel Systems, Inc. The call report management software described herein is preferably programmed using programming tools provided by the CRM vendor, and will preferably operate in conjunction with the CRM system. The Server 150 can comprise any conventional computer workstation or server with memory and processing capability sufficient to support the particular call report management software. The Server 150 will include a central processor unit ("CPU"), random access memory ("RAM"), read only memory ("ROM"), an operating system, software of the invention, and data-storage devices, along with various peripheral devices. Representative operating systems include Microsoft Windows, LINUX and UNIX.

In general, the Communication Infrastructure 120 can be any known or later developed combination of systems, computer programs or structures useable to wirelessly transmit and receive information between the Wireless Device 100 and the Server 150. The Communication Infrastructure 120 can include landline connections as well as wireless connections.

While the exemplary system architecture shown in FIG. 1 includes a single wireless device linked to a server, it is to be appreciated that the present invention will generally include numerous wireless devices linked to one or more server. Thus, the arrangement shown in FIG. 1 is a simplified system architecture of the present invention, meant for illustrative purposes.

Figure 2:
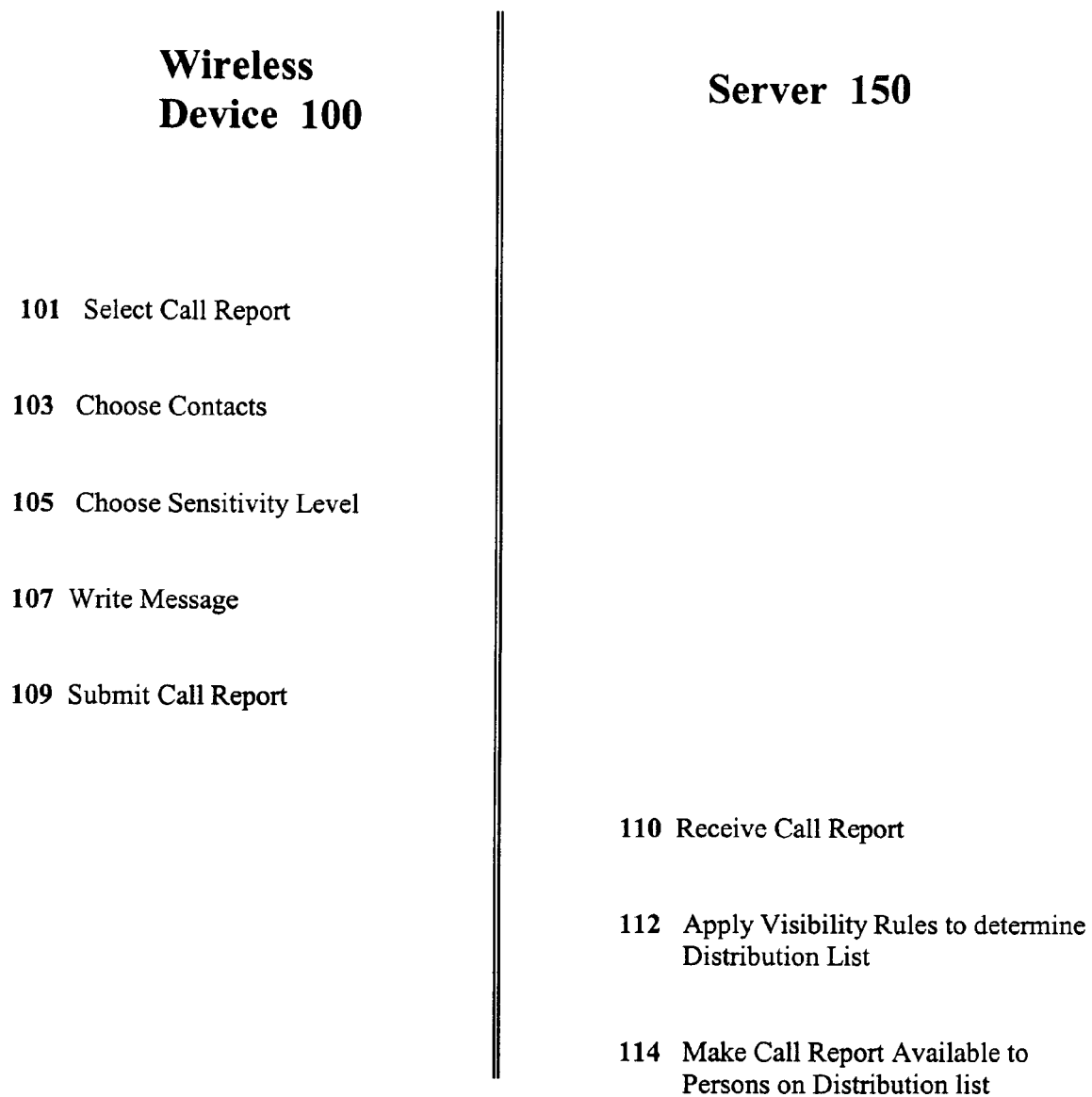
FIG. 2 is a diagram outlining various functions performed by an exemplary system for managing call reports.

FIG. 2 describes various functions performed by an exemplary system for managing call reports. As depicted in FIG. 2, functions 101-109 are performed by the Wireless Device 100, and functions 110-114 are performed by the Server 150.

Function 101 entails a user selecting a "New Call Report" function, such as by selecting this function from a main menu.

Figure 3A:
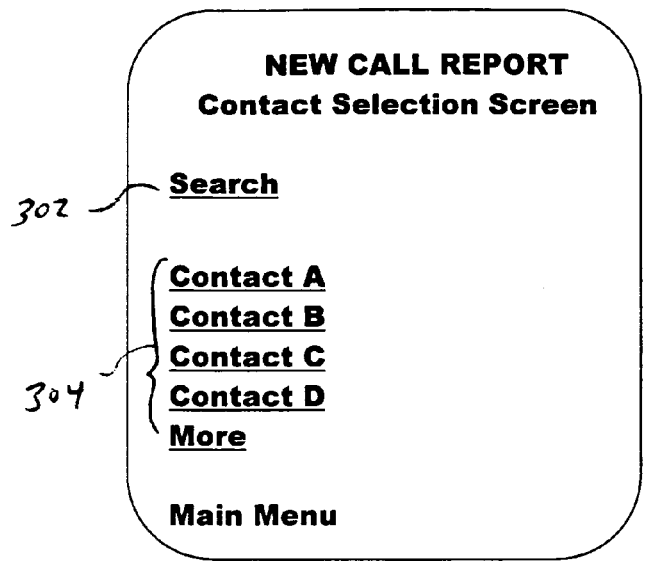
FIGS. 3(*a*) and (*b*) show exemplary New Call Report screens for entering information into a wireless device to create a call report.

Function 103 involves a user adding contacts to the call report As depicted in FIG. 3(a), a "Contact Selection Screen" include a list of contacts, such as contacts A-D 304. The user may select any of these contacts, for example, by double-clicking on each contact that he or she wishes to include. (Additional contacts may be obtained by selecting the "More" function). Contact information may include the contact's name, address, telephone number, etc. Alternatively, the user can search for additional contacts by using the Search function 302. This Search function 302 can make use of any search algorithm (e.g., a binary search).

Figure 3B:
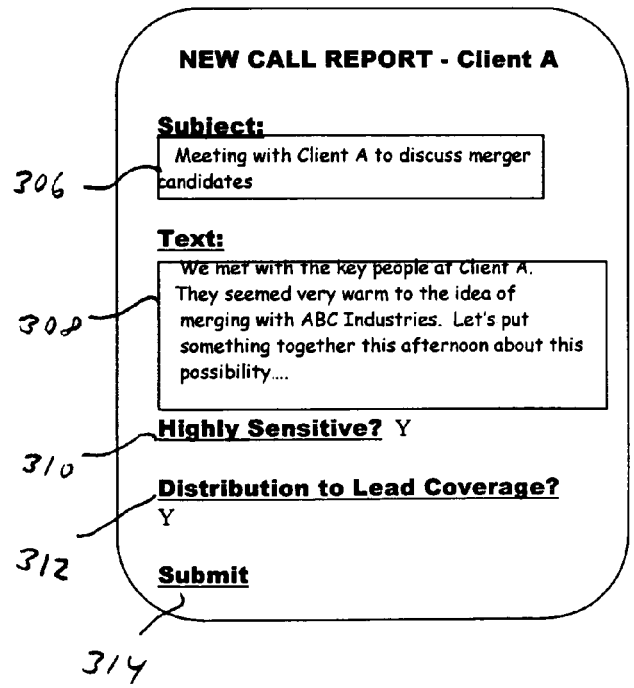

Function 105 involves the user selecting an appropriate sensitivity level. As depicted in FIG. 3(b), a "New Call Report" screen provides a template for formatting a call report. The sensitivity level may be set by either accepting the default or by toggling to another sensitivity level (e.g., highly sensitive, not sensitive). This may be accomplished by selecting item 304. In general, a highly sensitive document will receive heightened scrutiny, and may result in certain of the selected contacts not receiving copies of the call reports.

Function 107 involves the user writing a message. As depicted in FIG. 3(b), the user has written a text message in box 308, and included an optional subject heading in text box 306.

Function 109 entails the user submitting the call report. The user may choose to distribute the call report to the lead coverage team, by selecting "Y" at button 312. To submit the call report, the user may select the "submit" button 314.

Once the call report has been submitted, it will be transmitted to the Server 150.

Function 110 involves the call report being received by the Server 150.

Function 112 involves applying a set of Visibility Rules to determine a Distribution List for the call report. In general, the Visibility Rules are business rules that encapsulate the various legal and ethical requirements for allowing access to a client matter. Among the factors that may be considered are: (1) the organization to which the Filing Officer for the matter belongs, (2) the position (group) of an employee within the company, and (3) the inputted sensitivity flag value (or default value). Determination of (1) and (2) will involve additional processing on the Server 150, for example, to obtain the appropriate filing information and employees associated with the client matter. The client matter can have a unique identifier to facilitate this processing.

Any matter filed by a Filing Officer associated with a "public side" organization will be considered public information. Conversely, those matters which are filed by a Filing Officer of an organization who does inside deals will be considered inside information. In regard to the sensitivity value, this information can be input or set by default. However, certain products (e.g., Merger and Acquisition) will be deemed sensitive by rule. In regard to the position within the company, the following are examples (not meant to be exhaustive): (1) Over the Wall, (2) Insider Business Manager, (3) Insider Unit Head, (4) Insider General User, and (5) Client Executives. As implied, an "Over the Wall" employee has access to most any information. This position will usually be reserved for certain executive management. The other positions will be determined based on which matters the employee has worked on as well as the matters that are within the person's current responsibility.

It should be appreciated that the Visibility Rules described herein are provided for illustrative purposes and are not meant to be exhaustive. Furthermore, it is to be appreciated that the Visibility Rules may be adjusted from time to time by the organization.

In general, the server 150 will apply the set of Visibility Rules to determine access to the call report. Those persons who have access to the call report will be added to the Distribution List.

Function 114 entails making the call report available to the persons on the Distribution List. This may include selected contacts who were deemed to be allowed to view the material.

Figure 4A:
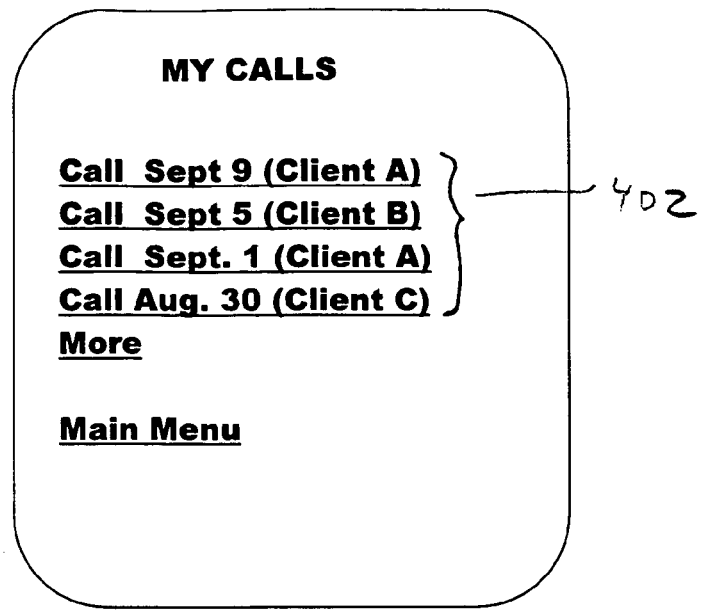
FIGS. 4(*a*) and (*b*) show exemplary screens for retrieving call reports which have already been created.
Figure 4B:
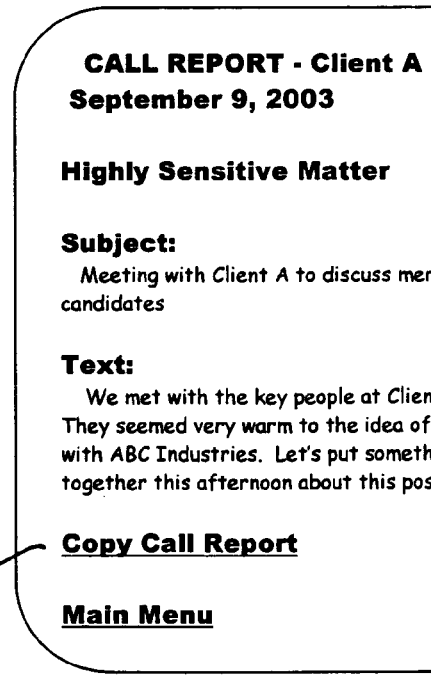

After a call report is distributed, the user may wish to view it, or use it as a template to create another call report. FIG. 4(a) shows a screen for listing various call reports 402. When the user selects one of the call reports 402, a screen, such the one depicted in FIG. 4(b), can be displayed. In this example, a call report created on Sep. 9, 2003, is displayed.

A template comprising a copy of the call report can be obtained by selecting the "Copy Call Report" button 404. In this case, the "New Call Report" screen can be displayed with some or all of the information copied from the template (including contacts).

In the embodiment described above, a call report is transmitted by the Wireless Device 100 to the Server 150 immediately upon submission by a user. However, a network connection may not be available. To deal with this situation, the Wireless Device 100 can be configured such that it can operate in either an on-line operating mode or an off-line operating mode. The device will be in the on-line operating mode when a network connection is available; otherwise, the device will be in the off-line operating mode. Call report information can be entered using the Wireless Device 100 in the off-line mode and automatically transmitted when the device assumes the on-line mode. To accomplish this the information entered using the Wireless Device 100 can be temporarily stored in memory, then retrieved from the memory when the device assumes the on-line operating mode. Once the information is retrieved, it can then be transmitted to the Server 150.

As depicted in FIG. 2, functions 101-109 are performed by the Wireless Device 100, and functions 110-114 are performed by the Server 150. It should be appreciated, however, that some of the functions 110-114 shown performed by the Server 150 could be performed by the Wireless Device 100, and vice versa. Furthermore, it is possible that certain of the functions 101-114 could be performed within the Communication Infrastructure 120.

To facilitate a clear understanding of the present invention, illustrative examples are provided herein which describe certain aspects of the invention. However, it is to be appreciated that these illustrations are not meant to limit the scope of the invention, and are provided herein to illustrate certain concepts associated with the invention. For example, while the examples shown herein are described with respect to the financial services industry, it is to be understood that the methods and systems of the present invention may also be suitable in other industries.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for managing call reports in a wireless network environment comprising the steps of:
   receiving a message and information regarding a client matter, the message and information providing a summary of an event;
   determining a distribution list by applying a predetermined set of business rules that encapsulate legal and ethical requirements for allowing access to the client matter, the business rules including restrictions based upon the position of a viewing employee within a company, the matters the employee has worked on, as well as the matters that are within the employee's current responsibility;
   creating a call report, the call report including the received message; and
   allowing access to the call report based on the distribution list.

2. The method of claim 1, wherein the business rules take into consideration whether the call report involves a sensitive subject.

3. The method of claim 1, wherein the business rules are adjustable.

4. The method of claim 1, wherein the information regarding the client matter includes a user-provided sensitivity indicator.

5. The method of claim 1, wherein the call report is at least partly based on a template.

6. The method of claim 1, wherein the call report is remotely accessible.

7. The method of claim 1, wherein the call report is distributed via electronic mail (e-mail) to persons in the distribution list.

8. The method of claim 1, wherein the call report is accessible via the wireless network.

9. The method of claim 8, wherein the call report is accessible using a wireless device.

10. The method of claim 9, wherein the wireless device is browser-based.

11. The method of claim 9, wherein the wireless device includes an Internet connection.

12. The method of claim 9, wherein the wireless device has an on-line mode and an off-line mode.

13. The method of claim 12, wherein the message is entered using the wireless device in the off line mode and automatically transmitted when the device is in the on-line mode.

14. The method of claim 9, wherein the wireless device is in the off line mode when a network connection is unavailable.

15. The method of claim 1, wherein a list of contacts is displayed to a user.

16. The method of claim 15, wherein the list of contacts is modifiable by the user.

17. The method of claim 1, wherein the call report includes a list of contacts and wherein the distribution list includes at least one recipient not included in the list of contacts.

18. The method of claim 1, further comprising the step of distributing the call report to a lead coverage team.

19. A system for managing call reports, comprising:
    a server configured to receive from a wireless device a message and information regarding a client matter, wherein the message and information provide a summary of an event, to determine a distribution list by applying a predetermined set of business rules that encapsulate legal and ethical requirements for allowing access to the client matter, the business rules including restrictions based upon the position of a viewing employee within a company, the matters the employee has worked on, as well as the matters that are within the employee's current responsibility, to create a call report including the received message, and to allow remote access to the call report based on the distribution list.

20. The system of claim 19, wherein the business rules are adjustable.

21. The system of claim 19, wherein the business rules take into consideration whether the call report involves a sensitive subject.

22. The system of claim 19, wherein the information regarding the client matter includes a user-provided sensitivity indicator.

23. A program storage device readable by a machine, tangibly embodying a program of instructions executable on the machine to perform method steps for managing call reports in a wireless network environment, the method steps comprising:
    receiving a message and information regarding a client matter, wherein the message and information provide a summary of an event;
    determining a distribution list by applying a predetermined set of business rules that encapsulate legal and ethical requirements for allowing access to the client matter, the business rules including restrictions based upon the position of a viewing employee within a company, the matters the employee has worked on, as well as the matters that are within the employee's current responsibility;
    creating a call report, the call report including the received message; and
    allowing access to the call report based on the distribution list.

* * * * *